United States Patent
Flachsbart et al.

(10) Patent No.: US 11,143,567 B1
(45) Date of Patent: *Oct. 12, 2021

(54) SYSTEMS AND METHODS FOR DETECTING WATER LEAKS

(71) Applicant: United Services Automobile Association (USAA), San Antonio, TX (US)

(72) Inventors: Matthew Flachsbart, Grapevine, TX (US); Snehal Desai, Richardson, TX (US); Richard D. Graham, Plano, TX (US)

(73) Assignee: United Service Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,786

(22) Filed: Jun. 2, 2020

Related U.S. Application Data (60) Continuation of application No. 16/560,562, filed on Sep. 4, 2019, now Pat. No. 10,712,225, which is a division of application No. 15/364,853, filed on Nov. 30, 2016, now Pat. No. 10,444,107.

(60) Provisional application No. 62/351,441, filed on Jun. 17, 2016.

(51) Int. Cl.
*G01M 3/04* (2006.01)

(52) U.S. Cl.
CPC .................. *G01M 3/04* (2013.01)

(58) Field of Classification Search
CPC .......... G01M 3/04; G01M 3/243; G01M 3/26; G01M 3/3236; G01M 3/2853; G01M 3/2815; G01F 1/74; G01F 1/684; G01F 1/00; G01F 1/28; G01F 7/00; G01F 5/00; G01F 1/10; G01F 1/667; G01F 1/662; G01F 1/66; B23K 9/323; B23K 11/3054; G01N 2291/2634; G01N 29/14; E21B 47/1025

USPC ........... 73/195–197, 592, 861.28, 40, 40.5 R
See application file for complete search history.

(56) References Cited

U.S. PATENT DOCUMENTS

| | | |
|---|---|---|
| 4,066,095 A | 1/1978 | Massa |
| 4,568,925 A | 2/1986 | Butts |
| 4,576,205 A | 3/1986 | Morinaga et al. |
| 4,580,442 A | 4/1986 | Jones |
| 4,939,923 A | 7/1990 | Sharp |
| 5,335,536 A | 8/1994 | Runnevik |
| 5,939,618 A | 8/1999 | Hu et al. |
| 6,094,135 A | 7/2000 | Sugimoto et al. |
| 6,175,310 B1 * | 1/2001 | Gott ...................... G01M 3/165 340/604 |
| 6,446,503 B1 | 9/2002 | Nukui et al. |
| 6,901,812 B2 | 6/2005 | Moscaritolo et al. |
| 6,912,907 B2 | 7/2005 | Fujimoto |
| 8,749,393 B1 | 6/2014 | Tollefson |
| 10,444,107 B1 * | 10/2019 | Flachsbart .............. G01M 3/04 |
| 2001/0017163 A1 | 8/2001 | Penza |

(Continued)

*Primary Examiner* — John Fitzgerald
*Assistant Examiner* — Truong D Phan
(74) *Attorney, Agent, or Firm* — Fletcher Yoder, P.C.

(57) ABSTRACT

A plumbing system may include a first conduit that supplies a fluid to a destination device. The plumbing system may also include a second conduit concentric to the first conduit. The second conduit includes an indicator material that changes one or more properties of the fluid supplied to the destination device when the fluid contacts the indicator material via an opening present in the first conduit.

17 Claims, 6 Drawing Sheets

(56) References Cited

U.S. PATENT DOCUMENTS

| | | |
|---|---|---|
| 2005/0044930 A1 | 3/2005 | Finlay et al. |
| 2006/0162429 A1 | 7/2006 | Omer |
| 2006/0185443 A1 | 8/2006 | Fujimoto |
| 2007/0125429 A1 | 6/2007 | Kandl |
| 2011/0197662 A1 | 8/2011 | McAlister |
| 2011/0199220 A1* | 8/2011 | McAlister ............ B01J 19/1812 |
| | | 340/605 |
| 2011/0232858 A1 | 9/2011 | Hara |
| 2011/0308259 A1 | 12/2011 | Wray et al. |
| 2012/0227176 A1 | 9/2012 | Sickler et al. |
| 2013/0299237 A1 | 11/2013 | Johnson et al. |
| 2014/0088534 A1 | 3/2014 | Kanakkanatt et al. |
| 2014/0116556 A1 | 5/2014 | Critsinelis et al. |
| 2014/0251831 A1 | 9/2014 | Ley et al. |
| 2014/0324004 A1* | 10/2014 | Song ..................... A61L 15/56 |
| | | 604/359 |
| 2015/0034198 A1 | 2/2015 | Cheatham et al. |
| 2015/0068288 A1 | 3/2015 | Gaudet et al. |
| 2016/0003702 A1 | 1/2016 | Lynch |
| 2016/0069924 A1 | 3/2016 | Norris et al. |
| 2017/0356172 A1 | 12/2017 | Searcy |

* cited by examiner

SYSTEMS AND METHODS FOR DETECTING WATER LEAKS

CROSS REFERENCE TO RELATED APPLICATIONS

This application is a continuation of U.S. patent application Ser. No. 16/560,562, filed Sep. 4, 2019, now U.S. Pat. No. 10,712,225, issued Jun. 14, 2020, which is a divisional of U.S. patent application Ser. No. 15/364,853 filed Nov. 30, 2016, now U.S. Pat. No. 10,444,107, issued Oct. 15, 2019, which claims priority to and the benefit of U.S. Provisional Patent Application Ser. No. 62/351,441 filed Jun. 17, 2016, both of which are incorporated herein by reference in their entireties.

FIELD OF THE TECHNOLOGY

The disclosed embodiments generally relates to detecting and providing notification of water leaks inside of homes and businesses.

BACKGROUND

Water leaks in homes and businesses cause a tremendous amount of damage to structures and contents. Leaks generally occur from a burst water pipe or leaking faucets or water using appliances. If an occupant is present and the leak is easily visible, water damage can often be prevented. However many leaks occur behind cabinets and in the walls so that even if an occupant is present, the leaks may not be discovered until a very substantial amount of damage has been caused. It is not uncommon for an undetected leak to literally create havoc and require major reconstruction to return the building to a usable state. Moreover, leaks induce the growth of hazardous mold.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below may be used in conjunction with a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 1:
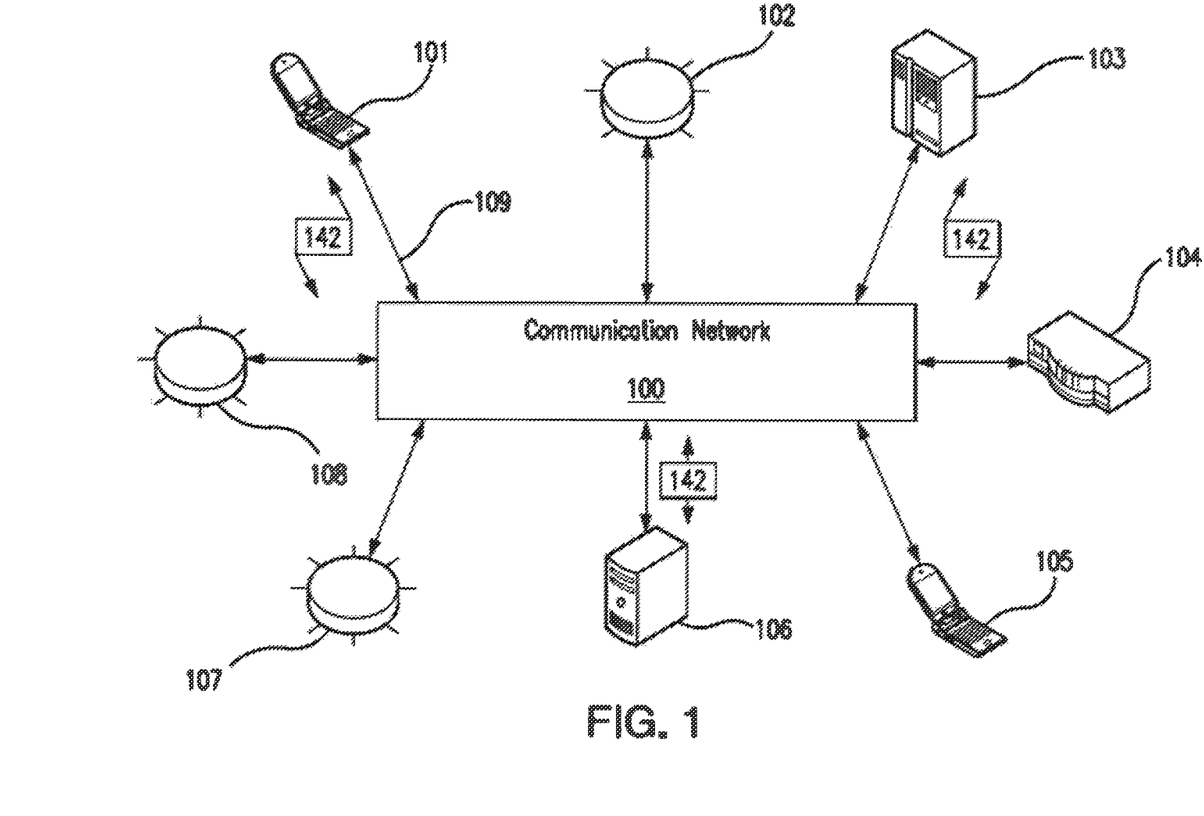
FIG. 1 illustrates an example communication network used in conjunction with one or more illustrative embodiments.

Turning now descriptively to the drawings, in which similar reference characters denote similar elements throughout the several views, FIG. 1 depicts an exemplary communications network 100 in which certain below illustrated embodiments may be implemented in conjunction therewith.

It is to be understood a communication network 100 is a geographically distributed collection of nodes interconnected by communication links and segments for transporting data between end nodes, such as personal computers, work stations, smart phone devices, tablets, televisions, gaming/media consoles, smart watches, smart wristbands, sensors and/or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
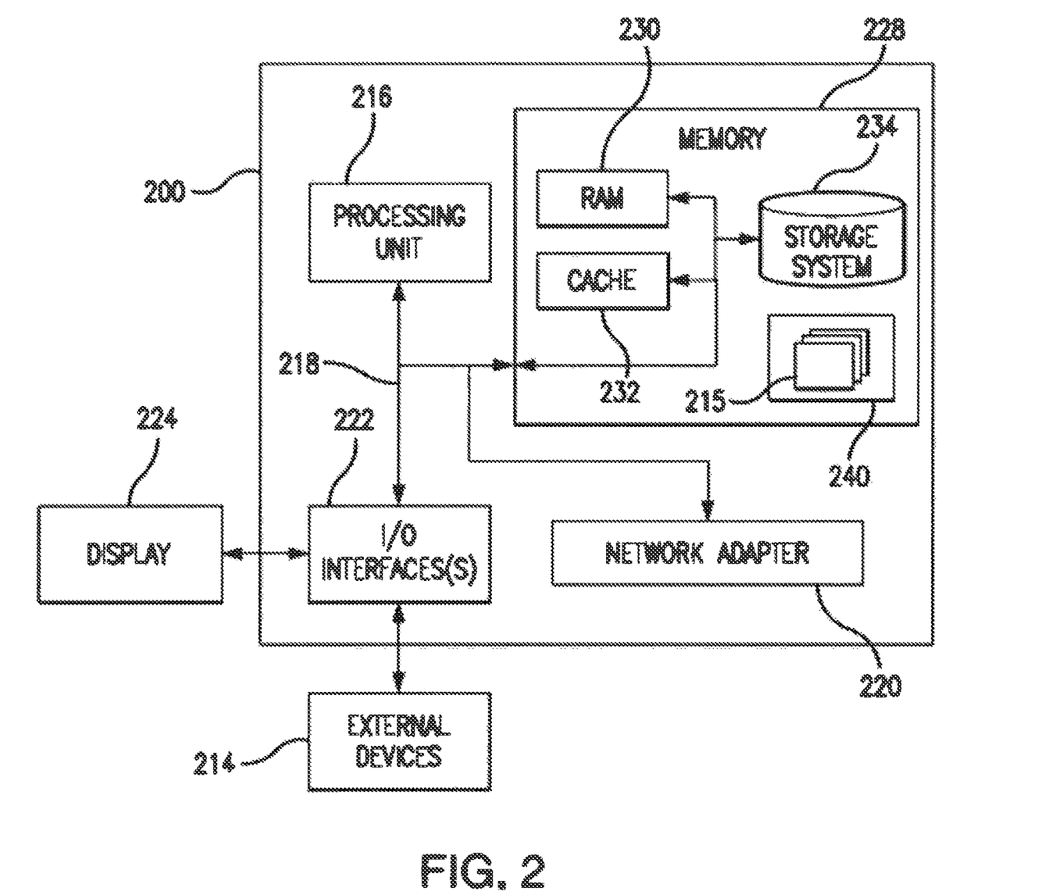
FIG. 2 illustrates an example computer controlled network device/node used in conjunction with one or more illustrative embodiments.

FIG. 2 is a schematic block diagram of an example network computing device 200 (e.g., a water flow sensor devices 520, 530, 535 and 540) and remote computing device 550 (e.g., client computing device 103, smart phone device 105, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Monitor module 200 is intended to represent any type of computer system capable of carrying out the teachings of various embodiments of the present disclosure. Monitor module 200 is only one example of a suitable system and is not intended to suggest any limitation as to the scope of use or functionality of embodiments of the disclosure described herein. Regardless, monitor module 200 is capable of being implemented and/or performing any of the functionality set forth herein.

Monitor module 200 is operational with numerous other general purpose or special purpose computing system environments or configurations. Examples of well-known computing systems, environments, and/or configurations that may be suitable for use with monitor module 200 include, but are not limited to, micro-controllers, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Monitor module 200 may be described in the general context of computer system-executable instructions, such as program modules, being executed by a computer system. Generally, program modules may include routines, programs, objects, components, logic, data structures, and so on that perform particular tasks or implement particular abstract data types. Monitor module 200 may be practiced in distributed data processing environments where tasks are performed by remote processing devices that are linked through a communications network. In a distributed data processing environment, program modules may be located in both local and remote computer system storage media including memory storage devices.

Monitor module 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Monitor module 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive") and from remote located database (e.g., "cloud" based storage devices). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other media (e.g., a USB storage device) can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 215, such as a water flow detection module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the disclosure as described herein.

Monitor module 200 may also communicate with one or more external devices 214 (either via a wired connection or wireless), such as a keyboard, smart phone device, a pointing device, a display 224, etc.; one or more devices that enable a user to interact with monitor module 200; and/or any devices (e.g., network card, modem, etc.) that enable monitor module 200 to communicate with one or more other computing devices. Such communication can occur via Input/Output (I/O) interfaces 222. Still yet, monitor module 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3A:
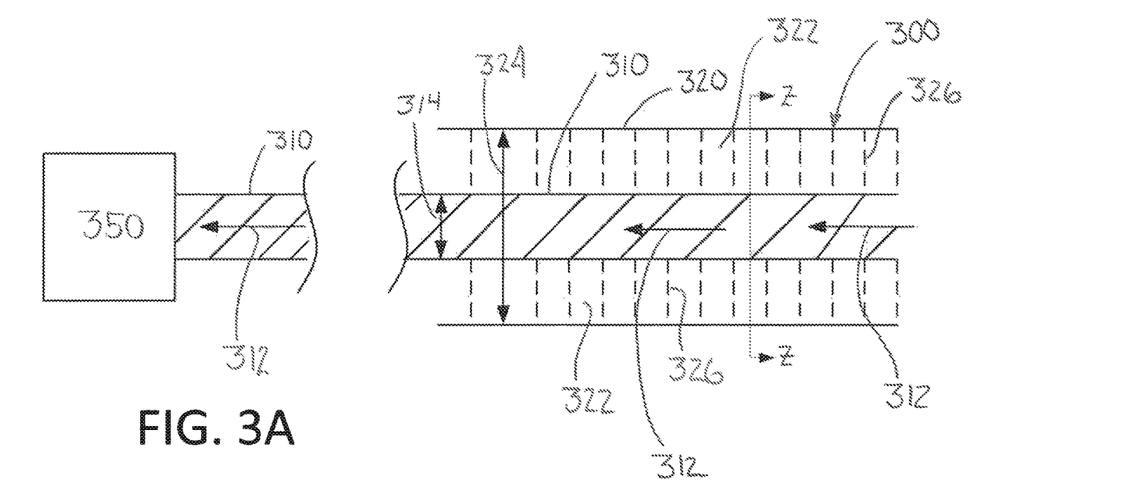
FIG. 3A depicts a cross-sectional view of concentric conduits in accordance with an illustrated embodiment.

With the exemplary communication network 100 (FIG. 1) and monitor module 200 (FIG. 2) being generally shown and discussed above, description of certain illustrated embodiments of the present disclosure will now be provided. With reference now to FIG. 3, it is to be understood and appreciated significant development and use of "smart home" related technologies have been made and the smart home sector is advancing rapidly. The illustrated embodiments provide devices, systems and methods for detecting water flow through a conduit for enabling leak flow detection and/or monitoring of water flow to appliances in a property. It is to be understood, water flow appliance devices as referred to herein consists of devices that consume and/or dispense water, such as (but not limited to a: faucet; shower; bath tubs; toilet; clothes washer machine; dishwasher; refrigerator; freezer; HVAC unit; and humidifier). It is to be appreciated that while the illustrated embodiments are for detecting water flow through a conduit, it is to be understood they may be configured to detect other flow types through a conduit (e.g., gas, compressed air, petroleum based fluids (heating oil) and other fluids). For instance, they may be configured to detect natural gas flow or heating oil flow through a conduit leading to a furnace appliance device. However, for ease of illustration and description purposes only, the embodiments illustrated herein are described herein in reference to water flow detection.

Figure 3B:
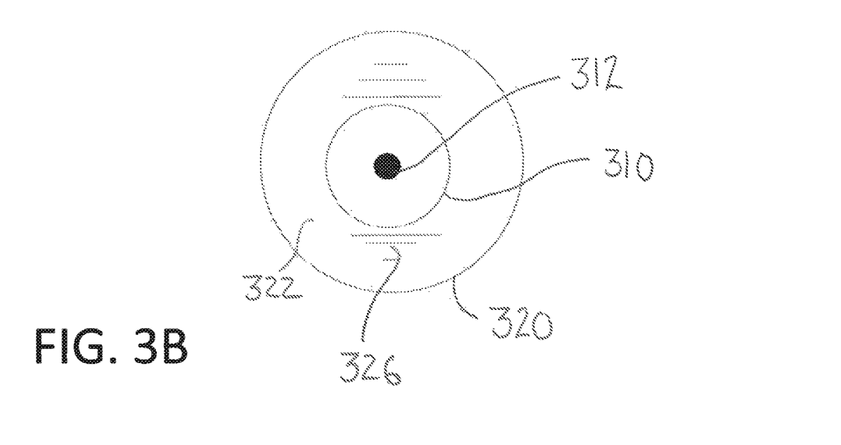
FIG. 3B depicts a cross-sectional view taken along Z-Z of FIG. 3A.

The water flow system/device/apparatus illustrated in FIGS. 3A and 3B is configured to detect and provide notification of a water flow leak in a conduit 310 supplying water flow 312 preferably to a destination device 350. The system, designated generally by reference numeral 300, preferably includes a first conduit 310 having a first diameter 314 supplying water flow 312 to preferably a destination device 350 for consuming and/or dispensing the water flow 312. Examples of the destination device 350 include (and are not to be understood to be limited to) a: faucet; shower; toilet; bathtub; clothes washer machine; and dishwasher.

A second conduit 320 preferably concentric with the first conduit 310 is provided for at least a portion of the length of the first conduit 310 wherein the second conduit 320 has a diameter 324 greater than the first diameter 314 forming a space 322 (leak space) between the first and second diameters 314, 324. Further provided is indicator material 326 provided in the leak space 322 such that when breakage is caused in the first conduit 310 effecting a water leak regarding the water flow 312 in the first conduit 310, the water flow 312 in the first conduit 310 is caused to interact with the leak indicator material 326 providing visual indication of the leak in the water flow 312 to the destination device 350.

It is to be appreciated the aforesaid visual indication caused by interaction of the water flow 312 with the leak indicator material 326 may consist of the water flow being a particular color. For instance, when a leak is caused in a conduit 310 providing water flow 312 to a faucet destination device 350, the water flow dispensed from the faucet 350 may have red color qualities to provide user notification of a leak/rupture in the conduit 310 causing the user to rectify the leak so as to mitigate any additional damages caused by the water leak in the conduit 310. In accordance with the illustrated embodiment, the leak indicator material 326 may consist of a color dye material. It is to be further appreciated the leak indicator material 326 may be consist of a liquid, solid or powder like material.

It is to be further appreciated the first conduit 310 is formed of a first material (e.g., copper, plastic, PVC and any other suitable material) and the second conduit 320 is formed of a second material (e.g., copper, plastic, PVC and any other suitable material) which may be either the same or different from the first material. Additionally, the second conduit 320 may retrofitted to be concentric with the first conduit 310 or may be formed in conjunction with the first conduit 310. For instance, in a scenario where the first conduit 310 for supplying a water flow 312 is preexisting in a residence, a home owner may retrofit the second conduit 320 with the first conduit 310 as illustrated and described herein. In continuing with this scenario, the second conduit 320 may consist of multiple sections that attach to one another, via affixing means (adhesive, snap fit pieces, etc.) or detachably assembly means (clamp assembly, threaded assembly, etc.). It is to be further appreciated the second conduit 320 may include a port for introducing, and removing, the indicator material 326 into, and out of, the leak space 322 for a desired purpose.

Figure 3C:
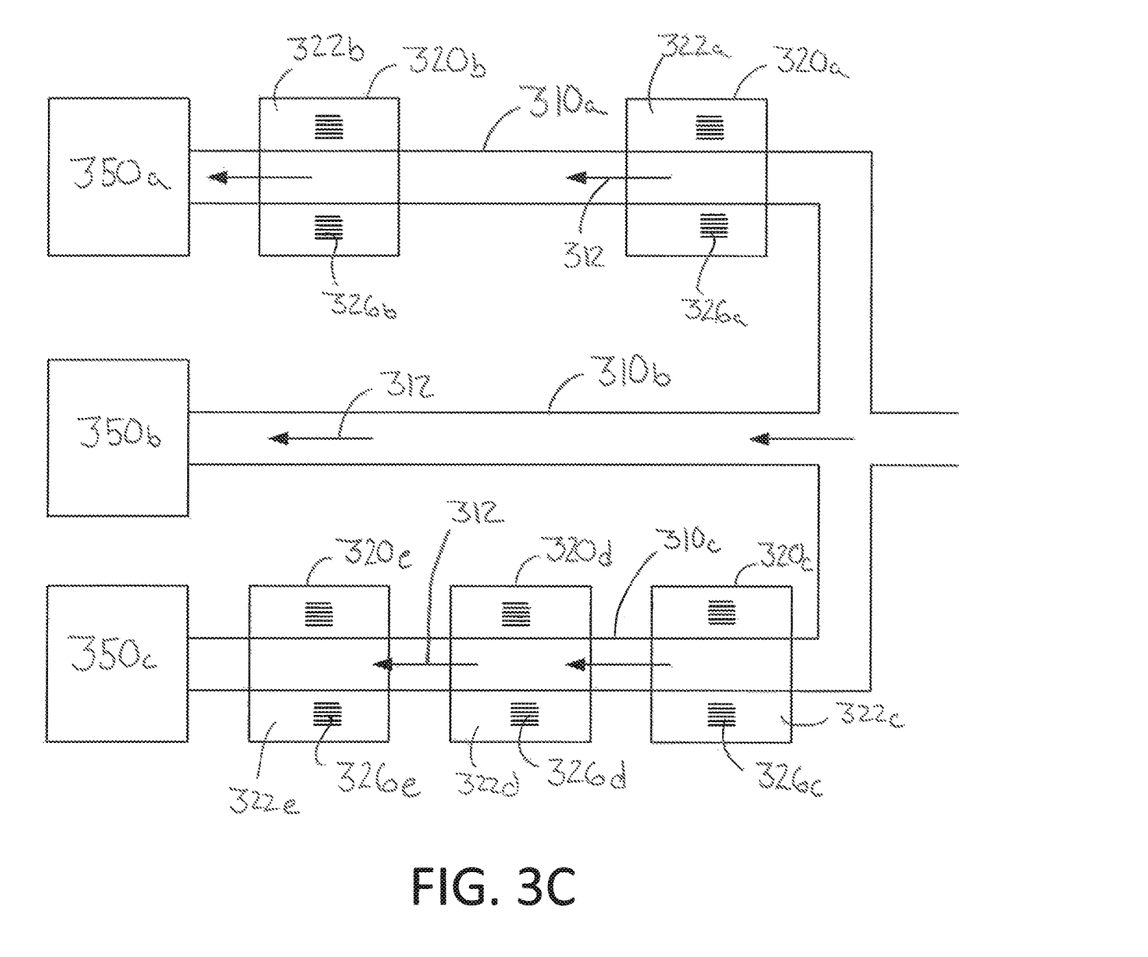
FIG. 3C depicts a system level view of the concentric conduits of FIGS. 3A and 3B.

With reference now to FIG. 3C, yet another illustrated embodiment of the system 300 will be described. As shown in FIG. 3C, a plurality of second conduit sections (320a-e) are provided relative to conduits 310a and 310b, whereby each the leak space (322a-e) of each second conduit section (320a-e) is provided with indicator material (326a-e) providing visual indication of a water leak different than that of another second conduit section. For instance, if a leak occurs in second conduit section 320a (located in a first floor of a residence), its indicator material 326a may cause water to be dispensed from a faucet appliance 350 to have a red color (as opposed to if a leak occurs in second conduit section 320b (located in a second floor of a residence), its indicator material 326b may cause water to be dispensed from a faucet appliance 350 to have a blue color) providing notification to the home owner of a leak in a section of conduit 310 positioned in the first floor, thus mitigating the often intrusive process to locate such leaks.

Figure 4:
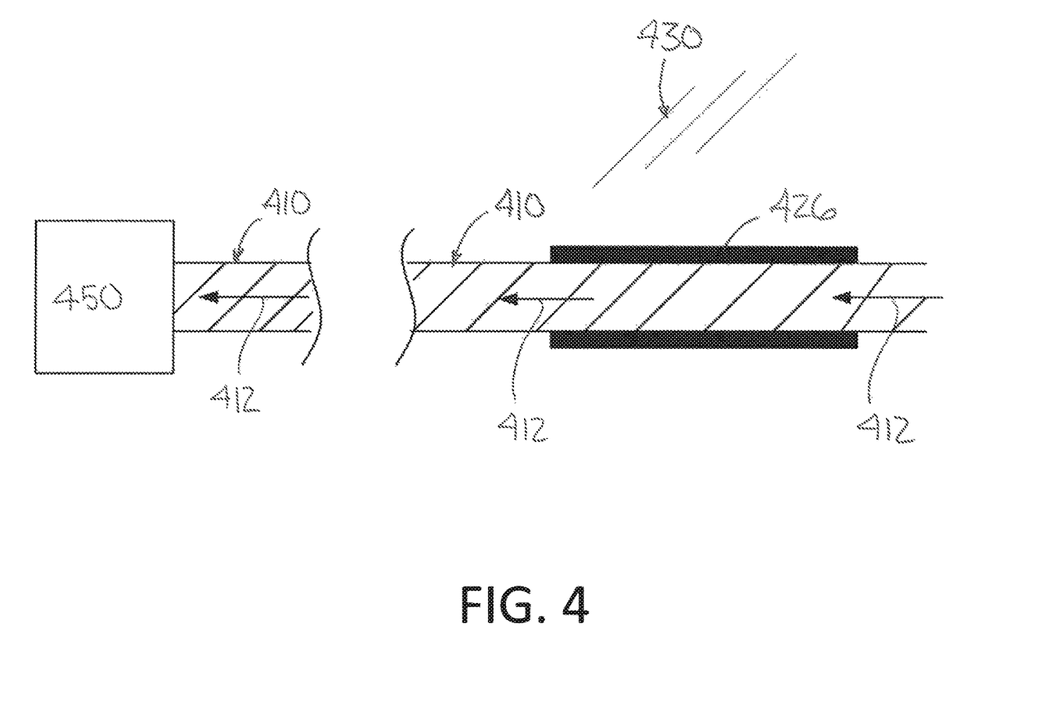
FIG. 4 depicts a cross-sectional view of a conduit in accordance with another illustrated embodiment.

With reference now to FIG. 4, another illustrated embodiment of the system 300 is depicted in which the first conduit 310 providing a water supply 412 to a destination device 450 incudes a coating of leak indicator material 426 provided on at least a portion of the outer diameter surface of the conduit 410 such that when breakage is caused in the conduit 410 effecting a water leak in proximity to the leak indicator material 426, the portion of the water leak which contacts the leak indicator material 426 is caused to create a reaction providing notification of the water leak. For instance, the leak indicator material 426 may consist of a glycol based material, which when it comes into contact with water, generates a reaction causing smoke 430. Thus, when a leak in conduit 410 occurs in proximity to the provision of the leak indicator material 426, smoke is caused to emit therefrom providing visual notification to a home owner of the leak. It is to be appreciated, the leak indicator material 426 may be selected to generate smoke of a certain color, or the leak indicator material 426 may be selected (e.g., sulfur based product) to provide a certain scent as opposed to smoke when water comes into contact therewith for providing leak notification.

It is to be appreciated the coating of leak indicator material 426 may be retrofitted to the outer diameter surface of the conduit 410 or it may be formed/distributed therewith. Additionally, as also described above with regards to the plurality of second conduit sections 320a-e (FIG. 3C), a plurality of portions of the outer diameter surface of the conduit 410 is each provided with indicator material 426 providing visual/scent indication of a water leak different than that of another section of the conduit 410 having a separate coating of leak indicator material 426 so as to aid a user in identifying the leak location, as mentioned above.

Figure 5:
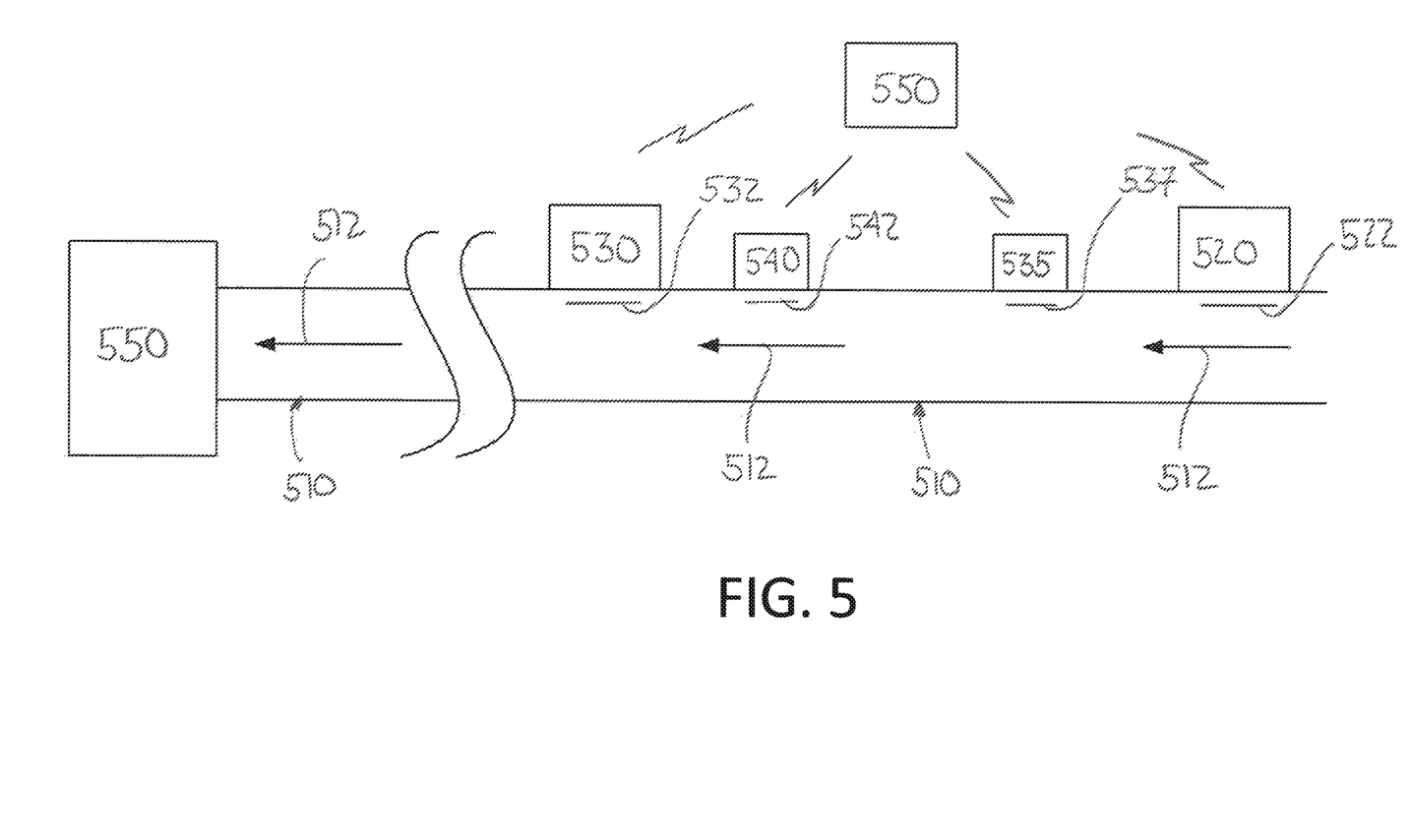
FIG. 5 depicts a cross-sectional view of a conduit in accordance with another illustrated embodiment.

With reference now to FIG. 5, another illustrated embodiment is shown and described for detecting water leaks in a conduit 510 supplying water flow 512 to preferably an appliance device 550. A first water flow sensor device 520 is associated with a first section 522 of the conduit 510 configured to determine the water flow 512 through the first section 522 and a second water flow sensor device 530 is associated with a second section 532 of the conduit 510 (wherein the second section 532 is preferably located downstream of the first section 522) configured to determine the water flow 512 through the second section 532. Each of the first and second water flow sensor 520 and 530 preferably include a transmitter device for transmitting a respective signal indicative of the determined water flow it is detecting.

A remote computing device 550 is communicatively coupled to the respective transmitters of the first and second water flow sensors (520, 530), whereby the remote computing device 550 is preferably operative and configured to receive the respective signals indicative of the determined water flow from each of the first and second water flow sensors (520, 530). The remote computing device is further preferably configured and operative to determine when the water flow of the second sensor 530 is less than the water flow of the first sensor 520 by a threshold amount so as to provide user notification of a leak occurring in the conduit 510 at a location between the first and second sensors (520, 530).

It is to be appreciated each of the aforesaid first and second sensors (520, 530) may be configured to be wired, or wirelessly coupled to, the remote computing device 550 via any known and suitable transmission means including (but not limited to) Bluetooth, Wi-Fi, RF, wherein each first and second sensor (520, 530) may include a WLAN IP address. It is to be further appreciated the remote computing device 550 may be chosen from the group consisting of: a computer server; a laptop device; a portable computing device; a smart phone device; and tablet device and the like. Additionally, the remote computing device 550 may be configured and operative to communicate with a user computing device (e.g., a portable computing device; a smart phone device; and tablet device and the like) for providing user notification thereof.

It is still further to be appreciated each of the first and second sensors (520, 530) is configured to either invasively, or non-invasively, couple to a section (e.g., 522) of the conduit 510. For instance, when invasive coupling is used, the sensor device may include an impeller device positioned in the conduit 510 for measuring water flow there through, and when non-invasive coupling is used, the sensor device may include a sonar device configured for sonic interaction with the water flow in the conduit 510 for flow measurement. Additionally, the remote computing device 550 may be further configured and operative to meter an amount of water consumed via the conduit 510 contingent upon the flow measurements from one, or both of, the first and second sensors (520, 530) thus providing metering information to a user regarding water consumption.

It is to be further appreciated the system illustrated in FIG. 5 may further include at least one or more secondary water flow sensors (535, 540) associated with a section of the conduit (537, 542) preferably intermediate the first and second sensors (520, 530). As described above with respect to the first and second sensors (520, 530), each secondary sensor (535, 540) preferably includes a transmitter device for transmitting a signal to the remote computing device 550 indicative of the determined water flow through the conduit section (537, 542) of the respective secondary sensor (353, 540) it is associated with. The remote computing device 550 is further preferably configured and operative to remotely actuate at least one secondary sensor (535, 540) when it is determined there is a leak in conduit 510 so as to measure the water flow between any combination of the first (520), second (530) and secondary sensors (535, 540) to determine if the leak is between that combination of sensors (e.g., sensors 520 and 540, or between sensors 540 and 530) so as to more precisely locate the leak location along the conduit 510.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A conduit, configured to:
   cover a preexisting conduit configured to supply a fluid to a destination device, wherein the conduit is configured to form a space between itself and the preexisting conduit when the conduit is positioned around the preexisting conduit, wherein the space comprises an indicator material configured to provide a visual indication in the fluid supplied to the destination device in response to contacting the fluid.

2. The conduit of claim 1, wherein the preexisting conduit is positioned concentric with respect to the conduit.

3. The conduit of claim 1, wherein the fluid comprises water, wherein the indicator material is configured to produce a smoke in response to water contacting the indicator material.

4. The conduit of claim 1, wherein the indicator material comprises a liquid, solid, or powder-like material.

5. The conduit of claim 1, wherein the visual indication in the fluid supplied to the destination device is indicative of a location of a leak in the preexisting conduit.

6. The conduit of claim 1, wherein the fluid comprises water, wherein the space comprises an additional indicator material configured to produce a scent in response to water contacting the additional indicator material.

7. The conduit of claim 1, wherein the indicator material is configured to change a color of the fluid supplied to the destination device in response to contacting the fluid.

8. The conduit of claim 7, wherein the indicator material is configured to:
   change the color of the fluid supplied to the destination device in response to contacting the fluid in a first portion of the conduit using a first color; and
   change the color of the fluid supplied to the destination device in response to contacting the fluid in a second portion of the conduit using a second color different from the first color.

9. The conduit of claim 7, wherein the indicator material is configured to change the color of the fluid supplied to the destination device in response to contacting the fluid caused by an opening present in the preexisting conduit.

10. A method, comprising:
    positioning a first conduit over a second conduit configured to supply a fluid to a destination device, wherein the first conduit is configured to form a space between the first conduit and the second conduit, and wherein the space comprises an indicator material configured to provide a visual indication in the fluid supplied to the destination device in response to contacting the fluid via an opening present in the second conduit.

11. The method of claim 10, wherein the fluid comprises water, wherein the indicator material is configured to produce a smoke in response to water contacting the indicator material.

12. The method of claim 10, wherein the indicator material is configured to change a color of the fluid supplied to the destination device in response to contacting the fluid.

13. The method of claim 12, wherein the indicator material is configured to change the color of the fluid supplied to the destination device in response to contacting the fluid in a first portion of the second conduit using a first color and change the color of the fluid supplied to the destination device in response to contacting the fluid in a second portion of the second conduit using a second color different from the first color.

14. A leak detection system, comprising a conduit configured to cover a preexisting conduit configured to supply a fluid to a destination device, wherein the conduit is configured to form a space between itself and the preexisting conduit when the conduit is positioned around the preexisting conduit, wherein the space comprises an indicator material configured to provide a visual indication in the fluid supplied to the destination device in response to contacting the fluid.

15. The leak detection system of claim 14, wherein the indicator material is configured to change a color of the fluid supplied to the destination device in response to contacting the fluid caused by an opening present in the preexisting conduit.

16. The leak detection system of claim 14, wherein the indicator material is configured to change a color of the fluid supplied to the destination device in response to contacting the fluid.

17. The leak detection system of claim 16, wherein the indicator material is configured to:
- change the color of the fluid supplied to the destination device in response to contacting the fluid in a first portion of the conduit using a first color; and
- change the color of the fluid supplied to the destination device in response to contacting the fluid in a second portion of the conduit using a second color different from the first color.

* * * * *